United States Patent [19]
Miller

[11] 4,325,805
[45] Apr. 20, 1982

[54] LUBRICATING OIL STABILIZATION

[75] Inventor: Stephen J. Miller, San Francisco, Calif.

[73] Assignee: Chevron Research Company, San Francisco, Calif.

[21] Appl. No.: 217,889

[22] Filed: Dec. 18, 1980

[51] Int. Cl.³ .................... C10G 45/06; C10G 45/36; C10G 65/02

[52] U.S. Cl. .................... 208/58; 208/18; 208/59; 208/61

[58] Field of Search .................... 208/18, 58, 89, 59, 208/61, 99

[56] References Cited

U.S. PATENT DOCUMENTS

| | | | |
|---|---|---|---|
| 3,399,132 | 8/1968 | Mulaskey | 208/111 |
| 3,480,531 | 11/1969 | Mulaskey | 208/143 |
| 3,876,522 | 4/1975 | Campbell et al. | 208/58 |
| 4,162,962 | 7/1979 | Stangeland | 208/58 |
| 4,181,598 | 1/1980 | Gillespie et al. | 208/58 |
| 4,183,801 | 1/1980 | Breuker et al. | 208/59 |
| 4,238,316 | 12/1980 | Mooi et al. | 208/58 |

*Primary Examiner*—Delbert E. Gantz
*Assistant Examiner*—G. E. Schmitkons
*Attorney, Agent, or Firm*—D. A. Newell; S. R. La Paglia; W. L. Stumpf

[57] ABSTRACT

An improved process for stabilizing catalytically dewaxed hydrocracked lubricating oils to ultraviolet radiation using a nickel-tin catalyst is disclosed.

9 Claims, 1 Drawing Figure

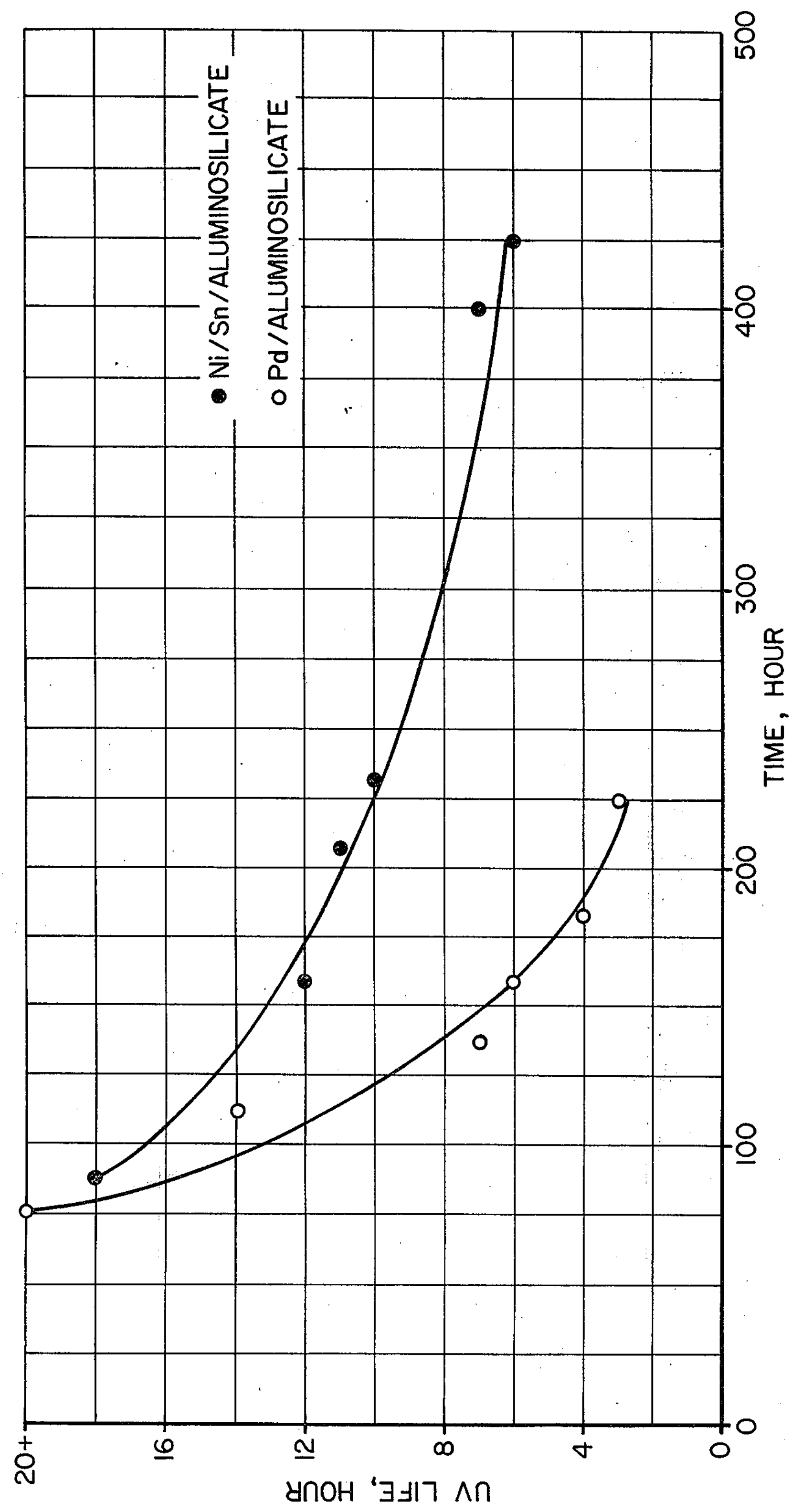
FIGURE
Ni/Sn/ALUMINOSILICATE
Pd/ALUMINOSILICATE
TIME, HOUR
UV LIFE, HOUR
0
100
200
300
400
500
20+
16
12
8
4
0

LUBRICATING OIL STABILIZATION

TECHNICAL FIELD

High-quality lubricating oils are critical for the machinery of modern society. Unfortunately, the supply of natural crude oils having good lubricating properties, e.g., Pennsylvania and Arabian Light feedstocks, is not enough to meet the demand. Additionally, because of uncertainties in world crude oil supplies, it is necessary to be able to produce high-quality lubricating oils efficiently from ordinary crude feedstocks.

Numerous processes have been proposed to produce lubricating oils from the ordinary and low-quality stocks which ordinarily would be converted into other products. For example, procedures using hydrocracking have been proposed. But hydrocracking lube oil stocks tend to be unstable in the presence of oxygen and light.

Many proposed process schemes involve the use of catalytic dewaxing to lower the pour point of the lube oil stock. Catalytic dewaxing tends to be more efficient than solvent dewaxing since it selectively removes undesirable components from the feed. However, while the product of a solvent extraction step tends to be stable to oxygen and to ultraviolet oxidation, the product from catalytically dewaxing a hydrocracked feedstock tends to be difficult to stabilize.

It can be appreciated that there is a continuing intensive effort to develop methods for producing lubricating oil stocks stable to oxidation. The object of the present invention is to provide such a process.

I have discovered that the oxidative stability of hydrocrackates which have been catalytically dewaxed using intermediate pore size zeolites can be greatly improved by hydrogenating the catalytically dewaxed hydrocrackate in the presence of a nickel-tin hydrogenation catalyst. Surprisingly, nickel-tin hydrogenation catalysts can impart greater stability than other stabilization catalysts such as some noble metal catalysts.

BACKGROUND ART

A number of patents relate to treating hydrocracked lube oil stocks.

U.S. Pat. No. 4,181,598, Gillespie et al., Jan. 1, 1980, discloses the preparation of a lube base stock oil of improved pour point and stability from waxy crude oil fractions by solvent refining, catalytic dewaxing over a ZSM-5 zeolite catalyst, and hydrotreating.

U.S. Pat. No. 4,162,962, Stangeland, July 31, 1979, discloses a sequential hydrocracking and hydrogenation process for the production of UV stable lube oils.

U.S. Pat. No. 3,962,071, Itoh et al., June 8, 1976, discloses a process for producing lubricating oils of greater stability by hydrogenating the lubricating oil fraction of a hydrocrackate in the presence of a palladium catalyst supported on a silica-containing refractory aluminum oxide carrier.

U.S. Pat. No. 3,876,522, Campbell et al., Apr. 8, 1975, discloses a process comprising hydrocracking an oil boiling above 650° F., fractionating the hydrocrackate into two lubricating oil fractions, and hydrogenating each of the two fractions.

U.S. Pat. Nos. 3,852,207, Stangeland et al., Dec. 3, 1974, 3,790,470, Mead et al., Feb. 5, 1974, and 3,666,657, Thompson et al., May 30, 1972, disclose improving the quality of hydrocracked oils by a subsequent hydrogenation step.

A number of issued patents relate to hydrocracking and catalytic dewaxing processes using nickel-tin catalysts.

U.S. Pat. No. 3,399,132, Mulaskey, Aug. 27, 1968, discloses hydrocracking with nickel/tin/porous acidic inorganic oxide catalysts.

U.S. Pat. No. 3,480,531, Mulaskey, Nov. 25, 1969, discloses a process for preparing saturated hydrocarbons from unsaturated hydrocarbons, to improve the smoke point of jet fuels, using hydrogen and a nickel/-tin/siliceous oxide catalyst.

U.S. Pat. No. 3,487,007, Mulaskey, Dec. 30, 1969, discloses a process for varying the aromatic content of hydrocrackates prepared using nickel/tin catalysts.

U.S. Pat. No. 3,520,820, Mulaskey, July 21, 1970, discloses a novel catalyst composition consisting essentially of nickel, or compounds thereof, tin or compounds thereof, associated with crystalline zeolite such as L, X, and Y. The catalyst is disclosed for use in hydrocarbon conversion processes.

U.S. Pat. No. 3,542,696, Mulaskey, Nov. 24, 1970, discloses a novel catalyst composition comprising nickel, or compounds thereof, associated with a coprecipitated composite of tin, or compounds thereof, and a siliceous oxide. The catalyst is disclosed for use in hydrocarbon hydroconversion processes.

U.S. Pat. No. 3,598,724, Mulaskey, Aug. 10, 1971, discloses a hydrocracking process for preparing $C_3$-$C_4$ hydrocarbons from feeds boiling above 600° F. using a nickel/tin/mordenite/porous inorganic oxide catalyst.

U.S. Pat. No. 3,620,963, Mulaskey, Nov. 16, 1971, discloses a catalytic hydrodewaxing process using a nickel/tin/mordenite/porous inorganic oxide catalyst.

FIGURE

The FIGURE illustrates the long-run life achieved with the nickel-tin catalyst of the process disclosed herein, as well as the good ultraviolet stability of the product lubricating oil. A comparison run with a palladium hydrogenation catalyst is illustrated.

TECHNICAL DISCLOSURE

The discovery of the present invention is embodied in a process for preparing lubricating oil stocks having good ultraviolet stability, comprising:

(a) hydrocracking in a hydrocracking zone a hydrocarbonaceous feedstock;

(b) catalytically dewaxing in a dewaxing zone at least part of the effluent of said hydrocracking zone with a dewaxing catalyst comprising an intermediate pore size zeolite;

(c) catalytically hydrogenating in a catalytic hydrogenation zone at least part of the effluent of said dewaxing zone by contacting at least part of said dewaxing zone effluent with a stabilizing catalyst comprising nickel, or a compound thereof, tin, or a compound thereof, and a siliceous matrix.

The hydrocarbonaceous feeds from which lube oils are made usually contain aromatic compounds as well as normal and branched paraffins of very long chain lengths. These feeds usually boil in the gas oil range above about 340° C. and below about 650° C. Preferred feedstocks are vacuum gas oils with normal boiling ranges above about 340° C. and below about 600° C., and deasphalted residual oils having normal boiling ranges above about 480° C. and below about 650° C.

Reduced topped crude oils, shale oils, liquified coal, coke distillates, flask or thermally cracked oils, atmospheric residua, and other heavy oils can also be used as the feed source.

The hydrocarbonaceous feed is hydrocracked using standard reaction conditions and catalysts. Hydrocracking can take place in one or more reaction zones and with or without initial denitrogenation or desulfurization steps.

Typical hydrocracking process conditions include temperatures in the range of 250°-500° C., pressures in the range of 30 to 205 bar, or more, a hydrogen recycle rate of 100-1100 SCM/KL, and a LHSV (v/v/hr) of 0.1-50.

Catalysts used in the hydrocracking zone or zones include those having hydrogenation-dehydrogenation activity, and active cracking supports. The support is often a refractory inorganic oxide such as silica-alumina, silica-alumina-zirconia and silica-alumina-titania composites, acid-treated clays, crystalline aluminosilicate zeolitic molecular sieves (such as Zeolite A, faujasite, Zeolite X and Zeolite Y), and combinations of the above.

Hydrogenation-dehydrogenation components of the hydrocracking catalyst usually comprise metals selected from Group VIII and Group VI-B of the Periodic Table, and compounds including them. Preferred Group VIII components include cobalt and nickel and their oxides and sulfides. Preferred Group VI-B components are the oxides and sulfides of molybdenum and tungsten. Thus, examples of hydrocracking catalysts which are preferred for use in the hydrocracking step are the combinations nickel-tungsten-silica-alumina and nickel-molybdenum-silica-alumina.

A particularly preferred hydrocracking catalyst for use in the present process is nickel sulfide/tungsten sulfide on a silica-alumina base which contains discrete metal phosphate particles (described in U.S. Pat. No. 3,493,517, incorporated herein by reference).

The hydrocracked feed is catalytically dewaxed using intermediate pore-size zeolites and standard reaction conditions. The intermediate pore size zeolites used in the dewaxing step are crystalline aluminosilicate zeolites having a silica to alumina mol ratio greater than about 10:1 and preferably greater than about 40:1. These zeolites can have useful dewaxing activity even at high silica:alumina mol ratios such as 200 to 500:1.

By "intermediate pore size" as used herein is meant an effective pore aperture in the range of about 5 to 6.5 Angstroms when the zeolite is in the H-form. Zeolites having pore apertures in this range tend to have unique molecular sieving characteristics. Unlike small pore zeolites such as erionite, they will allow hydrocarbons having some branching into the zeolitic void spaces. Unlike large pore zeolites such as the faujasites, they can differentiate between n-alkanes and slightly branched alkanes on the one hand and larger branched alkanes having, for example, quarternary carbon atoms.

The effective pore size of the zeolites can be measured using standard adsorption techniques and hydrocarbonaceous compounds of known minimum kinetic diameters. See Breck, *Zeolite Molecular Sieves,* 1974 (especially Chapter 8) and Anderson et al., J. Catalysis 58, 114 (1979), both of which are incorporated by reference.

Intermediate pore size zeolites in the H-form will typically admit molecules having kinetic diameters of 5.0 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular zeolite, but do not penetrate as quickly and in some cases are effectively excluded (for example, 2,2-dimethylbutane is excluded from H-ZSM-5). Compounds having kinetic diameters in the range of 6 to 6.5 Angstroms include: cyclohexane (6.0), 2,3-dimethylbutane (6.1), 2,2-dimethylbutane (6.2), m-xylene (6.1), and 1,2,3,4-tetramethylbenzene (6.4). Generally, compounds having kinetic diameters of greater than about 6.5 Angstroms do not penetrate the pore apertures and thus are not absorbed into the interior of the zeolite. Examples of such larger compounds include: o-xylene (6.8), hexamethylbenzene (7.1), 1,3,5-trimethylbenzene (7.5), and tributylamine (8.1).

The preferred effective pore size range is from about 5.3 to about 6.2 Angstroms. ZSM-5, for example, falls within this range.

In performing adsorption measurements to determine pore size, standard techniques are used. It is convenient to consider a particular molecule as excluded if it does not reach at least 95% of its equilibrium adsorption value on the zeolite in less than about 10 minutes ($p/po=0.5$; 25° C.).

Examples of intermediate pore size zeolites include, silicalite, the new zeolite CZH-5, and members of the ZSM series such as ZSM-5, ZSM-11, ZSM-12, ZSM-21, ZSM-23, ZSM-35, and ZSM-38.

Silicalite is described in U.S. Pat. No. 4,061,724; ZSM-5is described in U.S. Pat. Nos. 3,702,886 and 3,770,614; ZSM-11 is described in 3,709,979; ZSM-12 is described in 3,832,449; ZSM-21 and ZSM-38 are described in 3,948,758; ZSM-23 is described in 4,076,842; and ZSM-35 is described in 4,016,245. These patents are incorporated herein by reference. The preferred zeolites are ZSM-5 and CZH-5. CZH-5 is described in copending application Ser. No. 166,863, filed July 7, 1980, which is also incorporated herein by reference.

Typical dewaxing conditions include a LHSV (v/v/hr) of 0.5-200, a temperature from about 260°C.-610° C. and a pressure from below atmospheric to several hundred bar. Where the feed to the dewaxing step has a wide boiling range, it is especially preferred to separate it into at least two fractions, where each fraction has a boiling range of greater than about 50° C. When a wide boiling range feed is catalytically dewaxed, the higher boiling portions tend to be underdewaxed while the lower boiling portions tend to be overdewaxed. By splitting the feed to the dewaxing step, the different boiling range fractions can be dewaxed at different severities. After dewaxing, the separate streams can be recombined or processed separately.

The catalytic hydrogenation step is performed on all or part of the catalytically dewaxed hydrocrackate. The hydrogenation catalyst comprises nickel, or a compound thereof, tin, or a compound thereof, and a siliceous matrix. Methods for preparing these catalysts are disclosed in U.S. Pat. Nos. 3,399,132 and 3,542,696 which are incorporated herein by reference. The catalyst preferably comprises nickel and tin, or compounds thereof, in an amount from 2 to 50 combined weight percent metals, with a nickel to tin weight ratio of from about 0.25 to 20.

The hydrogenation catalyst preferably comprises a coprecipitated composite of catalytically active amounts of nickel and tin, or compounds thereof, and a porous inorganic oxide. The coprecipitated composite is preferably prepared by the coprecipitation or cogelation of a mixture of compounds of the hydrogenating metals, that is nickel and tin, and compounds of the metals or nonmetals whose oxides form the siliceous carrier.

The hydrogenation catalyst of the present invention can be prepared by coprecipitating or cogelling a mixture of a compound of tin and a compound of silicon. If desired, a compound of nickel may be present in the mixture prior to coprecipitation or cogelation. Also, other compounds of metals or nonmetals, or both, whose oxides form an inorganic oxide carrier, can be present in the mixture to be coprecipitated. Thus, for example, a compound of the metals or nonmetals, or both, of Groups II through VI of the Periodic Table can be present. Hence, in the finished coprecipitated composite, in addition to tin, or compounds of tin, and silica being present, there may also be alumina, magnesia, titania, zirconia and combinations thereof. Thus, the coprecipitated composite can comprise tin, or compounds of tin, and a siliceous matrix including, by way of example, silica-alumina, silica-magnesia, silica-zirconia, silica-magnesia-titania, and silica-alumina-zirconia. Silica-alumina is particularly preferred. The siliceous oxide should comprise at least about 30 weight percent silica, preferably 30 to 99 weight percent silica.

The coprecipitated composite should preferably have a high surface area, that is, a surface area greater than 50 $m^2/gm$ and preferably greater than 150 $m^2/gm$. Generally, the coprecipitated composite should have a surface area of from 50–700 $m^2/gm$.

As indicated above, the catalytic composition of the present invention must also have nickel or compounds thereof in association with the coprecipitated composite of tin, or compounds thereof, and the siliceous matrix. The nickel can also be present by impregnation, ion exchange, etc., but it is particularly preferred that the nickel be present as part of the coprecipitate.

Preferably, hydrogenation catalysts comprise nickel and tin, or compounds thereof, in an amount from 5 to 30 combined weight percent and still more preferably from 7 to 25.

The nickel and tin, or compounds thereof, should be present in the catalyst in a weight ratio of nickel to tin of from 0.25 to 20, determined as the metals. Preferably, the nickel to tin weight ratio is from 0.5 to 20 and most preferably 0.5 to 10. In general, when using high combined weights of nickel and tin, it is preferred to use high nickel to tin weight ratios.

The hydrogenating metals, that is, nickel and tin, can be in the metallic form, or in compound form, such as, for example, the oxide or sulfide form. However, any compounds of the metals which perform as hydrogenating components can be used in the catalyst.

The catalytic hydrogenation step is conducted at temperatures ranging from about 190° C. to about 340° C., preferably from about 210° C. to about 290° C.; at pressures from about 20 bar to about 225 bar, and at space velocities (LHSV) from about 0.1 to about 20. For maximum recovery of lubricating oil stock from the catalytic hydrogenation zone, it is preferred that the conversion be as low as possible consistent with stabilizing the oil. Conversion, unselective cracking by the nickel-tin catalyst, should be less than about 10%, preferably less than about 5%.

By "good ultraviolet stability" as used herein is meant that at least about 4 hours will pass in the test described below before an unsatisfactory level of floc appears. Preferably, at least 6 hours will pass. An unsatisfactory level of flock is moderate floc of the level found in mid-continent solvent refined 100 neutral oil after about 11 hours in the ultraviolet stability test.

The ultraviolet stability of the lube oil is measured by placing the oil samples in glass bottles 16 mm in diameter, 50 mm high and having a wall thickness of about 1 mm. The caps are loosened and the bottles are placed in a circular rack surrounding a 450-watt cylindrical Hanovia Mercury vapor lamp (product of Conrad Precision Industries, Inc.) mounted in a vertical position. The distance along a line perpendicular to the longitudinal axis of the lamp extending from the longitudinal axis of the lamp to the longitudinal axis of the bottle is 2 ½ inches. The sample is observed over a period of time. At the first appearance of a light fine floc (small particles suspended in the oil), the time to formation of the floc is noted. The additional time until a moderate floc or heavy floc is also noted. In some cases of poor stability, a ring of precipitated particles can be observed during the test clinging to the walls of the bottle. Typically, the test is terminated at 20 hours if no floc appears.

EXAMPLE 1

An experiment was performed to demonstrate the efficacy of my invention in stabilizing catalytically dewaxed hydrocracked lubricating oils to ultraviolet light. A comparison with a palladium hydrogenation catalyst shows the superiority of my process.

The feed was a light neutral feed which was the product of hydrocracking using a standard hydrocracking catalyst. The feed had the following characteristics:

| | |
|---|---|
| °API | 32.4 |
| aniline point, °C. | 94 |
| S, ppm | 4.2 |
| N, ppm | 1.6 |
| pour point, °C. | 18 |
| Distillation (ASTM D1160, °C.) | |
| start/15 | 340/367 |
| 10/30 | 371/380 |
| 50 | 389 |
| 70/90 | 398/414 |
| 95/E.P. | 420/433 |

The feed was catalytically dewaxed using a ZSM-5 intermediate pore-size zeolite. The hydrogenation catalysts were a cogelled nickel/tin aluminosilicate with 9.6% (w/w) nickel and 3.4% (w/w) tin, and a comparison palladium (0.3% w/w) aluminosilicate. The dewaxing and stabilization reaction zones were in the same reactor with a ratio of dewaxing to stabilization catalyst of 1 to 2. Reaction conditions included total pressure −2000 psig; dewaxing LHSV-2; stabilization LHSV=1; gas rate of 340 SCM/bbl of hydrogen. The feed was dewaxed to a pour point of −29° C. (dewaxing zone temperature 271° C.–283° C.); stabilization zone temperature was 232° C.

The results shown in the FIGURE illustrate the long run life for producing UV stable lube oils using the process of the present invention.

EXAMPLE 2

A series of experiments was performed to examine the effects of varying the temperatures of the dewaxing and hydrogenation steps as well as the effect of hydrogenation components on the dewaxing catalyst.

The light neutral feed had the following characteristics:

| | |
|---|---|
| Gravity, °API | 34.6 |
| S, ppm | 13 |
| N, ppm | 1.0 |
| pour point, °C. | +27 |
| VI | 107 |
| P/N/A/S, Vol % | 43.3/46.3/10.3/0.0 |
| PCA, Vol % | 2.8 |
| Distillation, D1160, °C. | |
| 5/10 | 350/360 |
| 30/50 | 370/378 |
| 70/90 | 387/405 |
| 95/E.P. | 416/441 |

The dewaxing catalyst was a ZSM-5 zeolite with either hydrogen or nickel cations. In experiments A-E, the stabilizing catalyst was a cogelled nickel (9.6% w/w)-tin (3.4% w/w) aluminosilicate. Experiment F was performed without a stabilization step.

The dewaxing zone LHSV was 2; the stabilizing zone LHSV was 1. Total pressure was 138 bar; gas rate was about 283 SCM/bbl hydrogen. The dewaxing catalysts, operating temperatures and results appear in the table.

TABLE

| | A | B | C | D | E | F |
|---|---|---|---|---|---|---|
| Dewaxing Catalyst | HZSM-5 | HZSM-5 | HZSM-5 | Ni-HZSM-5 | Ni-HZSM-5 | HZSM-5 |
| T(Dewaxing)/T(Stabilizing), °C. | 277/254 | 288/204 | 296/232 | 288/232 | 293/232 | 293/— |
| Conversion <371° C., % | 33 | 25 | 31 | 31 | 34 | 24 |
| Pour Point, °C. | 43 | 5 | −6 | −9 | −35 | −6 |
| UV Life, Hr | 20+ | 5 | 7 | 5 | 7 | 2 |

Samples were tested for UV stability after about 48 hours of operation at each set of conditions. The conversion is the total for dewaxing and stabilizing steps. Observation of the results of test conditions C beyond 500 hours operation showed the conversion rate had decreased to 28% while the UV life remained at 7 hours.

These data illustrate that very stable oils can be produced but at undesirably high pour points (Run A), the high pour point indicating that substantial cracking is occurring over the stabilizing catalyst. Lowering the temperature in the stabilizing zone lessens unselective cracking but also lowers the UV stability. Comparing the results of experiment C (with stabilization step) and F (without stabilizing) shows a substantial improvement in UV stability at only 4–7% conversion in the catalytic hydrogenation step.

What is claimed is:

1. A process for producing lubicating oil stocks having good ultraviolet stability, comprising:

(a) hydrocracking in a hydrocracking zone a hydrocarbonaceous feedstock;

(b) catalytically dewaxing in a dewaxing zone at least part of the effluent of said hydrocracking zone with a dewaxing catalyst comprising an intermediate pore size zeolite;

(c) catalytically hydrogenating in a catalytic hydrogenation zone at least part of the effluent of said dewaxing zone by contacting at least part of said dewaxing zone effluent with a stabilizing catalyst comprising nickel or a compound thereof, tin or a compound thereof, and a siliceous matrix.

2. The process of claim 1 wherein said conversion rate in step (c) is less than about 10%.

3. The process of claim 2 wherein said conversion rate is less than about 5%.

4. The process of claim 1 wherein said stabilizing catalyst is prepared by cogelling nickel, or a compound thereof, tin, or a compound thereof, and the components of said siliceous matrix.

5. The process of claim 1 wherein the effluent of step (c) has an ultraviolet stability of about four hours or greater.

6. The process of claim 1 wherein the temperature in said catalytic hydrogenation zone is from about 190° C. to about 340° C.

7. The process of claim 1 wherein said temperature is from about 210° C. to about 290° C.

8. The process of claim 1 wherein said hydrocarbonaceous feedstock is a light neutral feedstock.

9. The process of claim 1 wherein said intermediate pore-size zeolite is selected from silicalite, ZSM-5, ZSM-11, ZSM-23, ZSM-38, and CZH-5.

* * * * *